April 9, 1957     C. N. ARONSON     2,787,826
WORK HOLDER

Original Filed Jan. 12, 1946     2 Sheets-Sheet 1

INVENTOR.
Charles N. Aronson
BY
Bean, Brooks, Buckley & Bean.
ATTORNEYS

April 9, 1957 C. N. ARONSON 2,787,826
WORK HOLDER
Original Filed Jan. 12, 1946 2 Sheets-Sheet 2

INVENTOR.
Charles N. Aronson
BY
Bean, Brooks, Buckley & Bean
ATTORNEYS

United States Patent Office 2,787,826
Patented Apr. 9, 1957

2,787,826

WORK HOLDER

Charles N. Aronson, Arcade, N. Y.

Continuation of application Serial No. 676,255, January 12, 1946. This application March 10, 1950, Serial No. 149,037

7 Claims. (Cl. 29—288)

This invention relates to supporting apparatus and particularly to novel work positioning means. This application is a continuation of my copending application Serial No. 676,255, filed January 12, 1946, now abandoned.

In the performance of various fabricating and other operations on a work piece or other object, it is frequently desirable that the object be supported in a position in which it is conveniently accessible to the workman or other operator. Further, it is of substantial advantage in many such cases if the work piece or other object be freely movable into various positions. The apparatus of the present invention provides a support or work holder of this general character and one which offers advantages not afforded in any prior art apparatus.

The apparatus of the present invention may be employed in any environment or in the performance of any kind of operation dealing with any kind of work piece or other object. However, for the purpose of giving a specific example of one kind of work wherein the apparatus of the present invention gives greatly improved operation, reference will be had to the holding of a work piece or other object to be welded. In various kinds of welding it is frequently desirable that the part being worked upon be freely movable and supportable in a wide variety of positions. For instance, the gravity flow of welded metal and fused metal about a weld is usually an important factor in welding, and it is highly desirable that the welder be able to control such gravity flow by a change in position of the object being welded.

The present apparatus affords a novel support wherein, after suitable adjustment, an object may be universally rotated in any direction to freely adjust its position or attitude, and the arrangement is such that the support will tend to retain any adjusted position without any tendency of the part of the object to move from such position under the force of gravity acting thereon. This is accomplished by providing supporting apparatus which permits universal rotation of the work piece or other object about any axis through its center of mass.

A careful consideration of the following detailed description of an exemplary form of apparatus for carrying out my invention will illustrate the underlying principles. However, it is to be understood that the form of my invention shown in the drawings and described in the following specification may be varied widely without departing from the spirit or scope of the invention which is limited only as defined in the appended claims.

Figure 1:
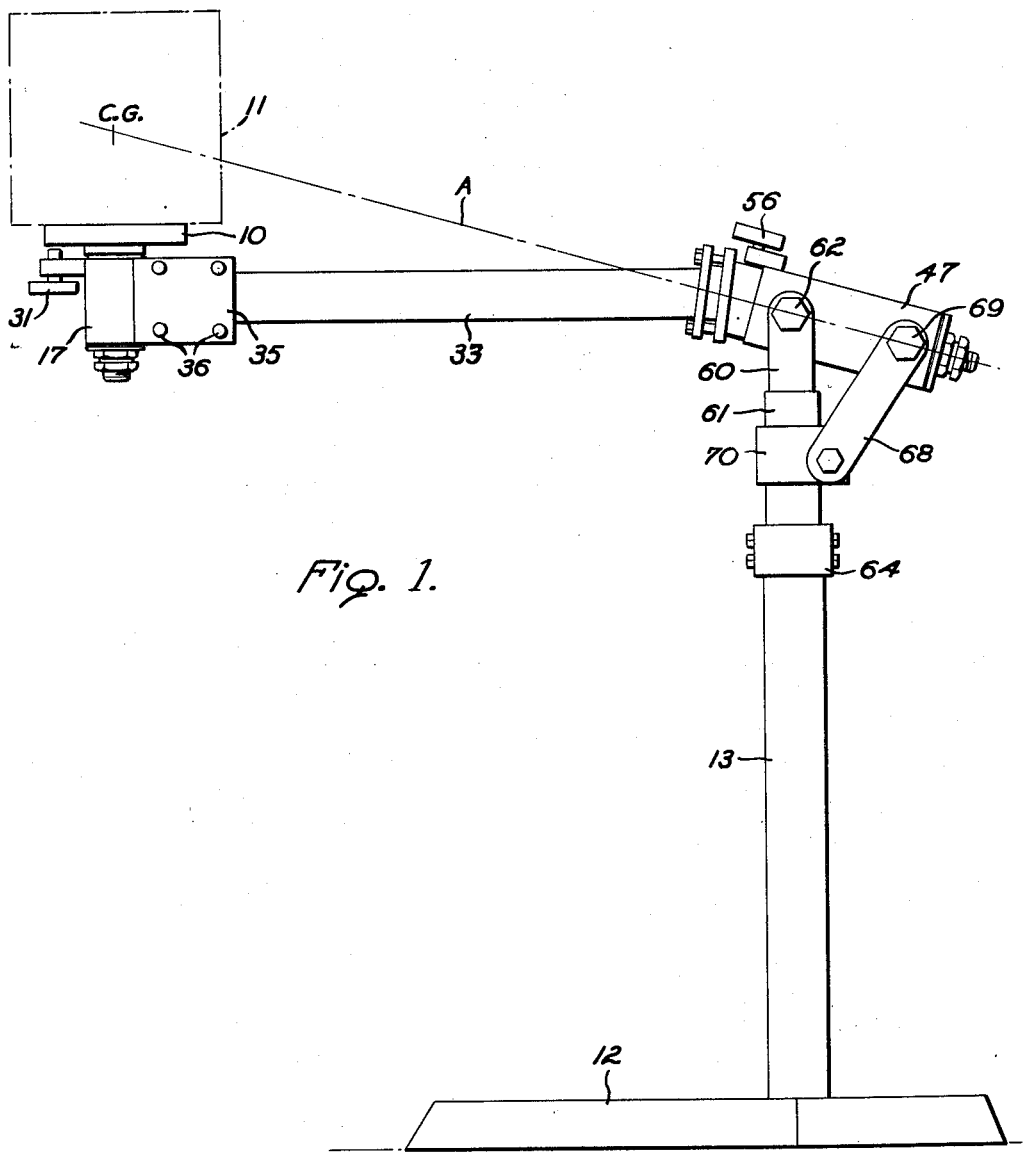
Fig. 1 is a general elevational view of one form of the supporting apparatus of my invention.

Referring to Fig. 1, the apparatus shown by way of example comprises generally a work holding table 10 upon which a work piece is schematically indicated in dot and dash lines at 11. The work piece may be secured directly to table 10 or a vice or other holding device may be secured to the table for holding the work piece.

Figure 2:
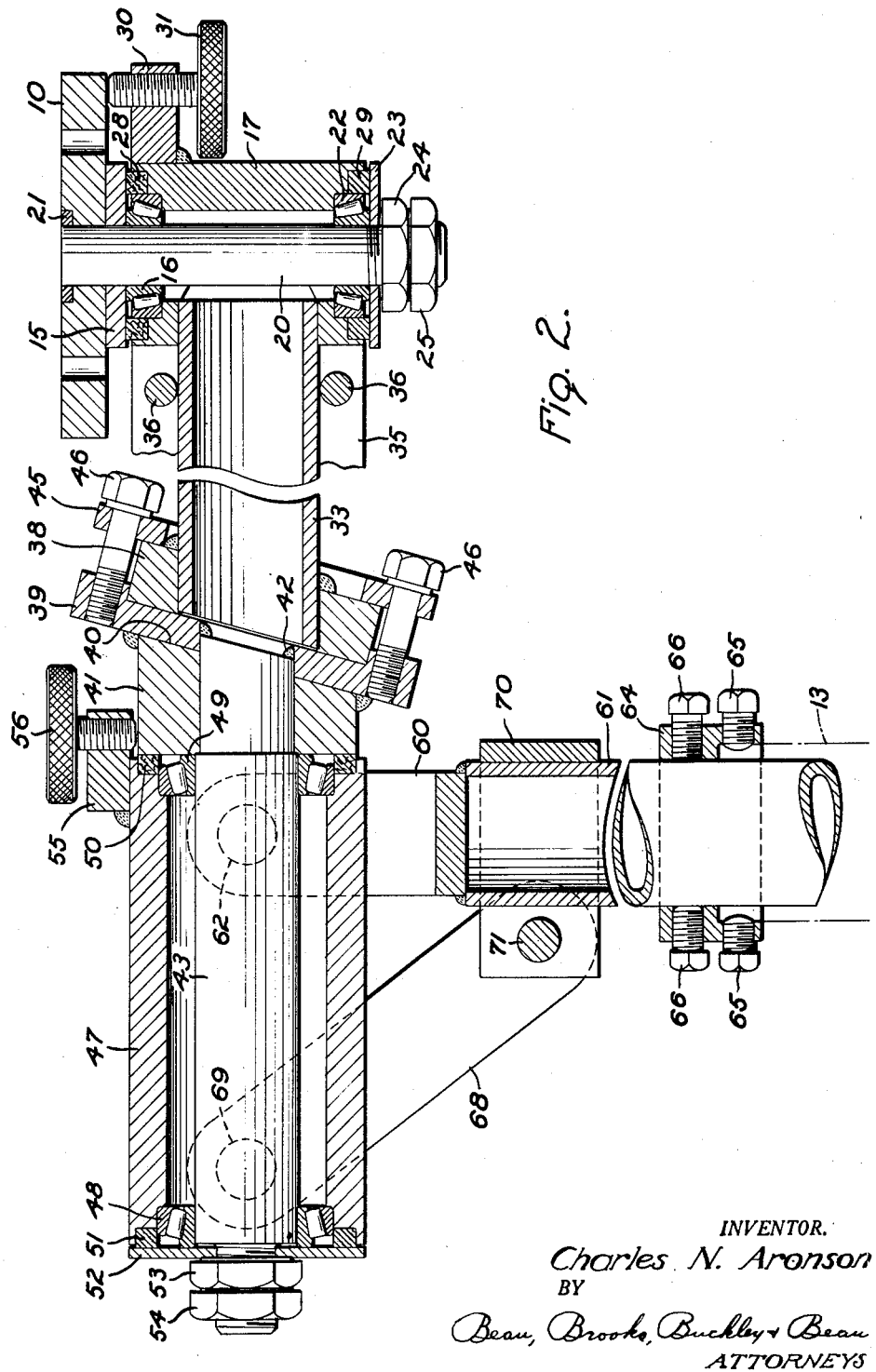
Fig. 2 is a longitudinal cross-sectional view of the upper portion of Fig. 1 on an enlarged scale and viewed from the opposite side.

The general support for the apparatus includes a pedestal comprising a base 12 and a tube 13 rising rigidly therefrom. The base and tube may be secured to each other in any desired manner. The intervening structure between tube 13 and work supporting table 10 is shown in detail in Fig. 2 and reference will now be had thereto. By way of explanation, Fig. 2 shows the various parts in a preliminary unadjusted position while Fig. 1 shows an arrangement wherein the parts have been adjusted to accommodate a particular job or piece of work.

Beginning at the work table end of the supporting mechanism and apparatus, table 10 rests upon a thrust washer 15 which in turn rests upon the inner race of a tapered roller bearing 16 whose outer race rests in the upper end of a hub element 17. A spindle 20 is fixed to and depends from table 10. The upper end of spindle 20 may be secured to table 10 as by a weld indicated at 21 in Fig. 2.

Spindle 20 extends through bearing 16 and a lower tapered roller bearing 22 which is set into the lower end of hub element 17, and a retaining washer 23 and retaining nuts 24 and 25 are associated with the threaded lower end of spindle 20. At its upper end hub element 17 receives a packing ring 28 and at its lower end a collar 29, preferably of bearing metal. Collar 29 establishes constant low-resistance electrical conductivity between spindle 20 and hub element 17 through washer 23.

Hub element 17 has a lug 30 fixed to its upper end, as by welding, and lug 30 is threaded to receive a stop screw 31. By tightening the latter the table 10 may be locked in any desired angular position with respect to the axis of spindle 20. If desired, conventional indexing means may also be provided for readily locating table 10 in a series or variety of such angular positions.

Hub element 17 is rotatably disposed upon one end of a tube 33 and to this end hub element 17 has a split sleeve portion 35 which extends along tube 33 and serves to lock hub element 17 in any desired angular position upon tube 33 through the cooperation of bolts 36.

At its opposite end tube 33 has fixed thereto, as by welding, a collar 38 whose axis is disposed obliquely relative to the axis of tube 33, as appears clearly in Fig. 2. Collar 38 is received in an annular recess formed in the face of a flange 39 which is welded to an oblique face 40 of a hub element 41 and is also welded, as at 42, to one end of a shaft 43, so that shaft 43, hub element 41 and flange 39 comprise, in effect, a single rigid element.

Collar 38 may be rotatably adjusted in its annular recess in flange 39 and is clamped in any desired adjusted position by means of a clamping ring 45 and cooperating clamping screws 46 which thread into flange 39, all as clearly shown in Fig. 2.

Shaft 43 is mounted for free rotation in a sleeve 47, preferably by means of a pair of spaced tapered roller bearings 48 and 49 set into annular recesses in the opposite ends of sleeve 47. Sleeve 47 is further formed to receive a packing ring 50 which engages against hub element 41 and a bearing metal ring 51 which is engaged by a retaining washer 52 which also engages against the inner race of bearing 48 and is held in adjusted retaining position by a pair of nuts 53 and 54 which engage the threaded end of shaft 43, as shown.

The metal ring 51 establishes continuous low resistance electrical conductivity between shaft 43 and sleeve 47, by way of retaining washer 52. By reason of the presence of rings 29 and 51, the entire apparatus comprises a continuous low-resistance conductor and the base 12 or pedestal tube 13 may have a ground connection to comprise one terminal of an electrical welding circuit.

Sleeve 47 has a lug 55 fixed to the end adjacent hub element 41, as by welding, and lug 55 is threaded to receive a stop screw 56. By tightening the latter the shaft 43, and all of the parts supported thereby, may be locked in any desired angular position with respect to the axis of shaft 43, if desired.

Sleeve 47 has trunnion support in a U-shaped bracket 60 which is welded or otherwise fixed to the upper end of a supporting tube 61. Pivot pins for supporting sleeve 47 in bracket 60 are indicated at 62. Supporting tube 61 telescopes within pedestal tube 13 and is vertically adjustable therein. A collar 64 fits over the top of tube 13 and is locked thereto by setscrews 65. Collar 64 slidably receives supporting tube 61 and the latter may readily be held in any desired vertical position therein by means of setscrews 66.

In Fig. 2 the axis of shaft 43 is shown extending horizontally. However, the disposition of this shaft axis may readily be varied by pivotal movement of sleeve 47 on pivot pins 62 and sleeve 47 is held in any desired angular position through the intervention of a pair of links 68 which are pivoted to opposite sides pivoted to a split collar 70 as at 71. The pivot 71 may comprise a nut and bolt or a screw, serving to lock the split collar selectively in any desired position along tube 61, to thereby adjust the angularity of the axis of shaft 43 about the axis of the pivot pins 62 and lock sleeve 47 in such adjusted position.

In use, the holding apparatus described in detail in the foregoing, operates in a manner which will now be described. In the first instance, the work or other object to be supported is secured to table 10 in any desired manner, but in such position that its center of gravity coincides with a vertical extension of the axis of spindle 20. If a vise or other intermediate holding means intervenes between table 10 and the work or other object, then the collective center of gravity of the object and such holding means is located directly above the axis of spindle 20.

When the work is thus secured with respect to table 10, screws 46 are loosened and collar 38 and flange 39 are rotated relative to each other to deflect the axis of tube 33 relative to the axis of shaft 43. As a part of the same adjustment hub element 17 is rotated about tube 33, and the deflection of the axis of tube 33 and rotation of hub element 17 thereon is continued until the center of gravity of the work, or more probably the center of gravity of the work and all of the parts which are supported by shaft 43, is intersected by an extension of the axis of shaft 43. Stated another way, relative rotative adjustment of collar 38 and flange 39 and adjustment of hub element 17 about tube 33 is carried to the point where shaft 43, in its rotation in bearings 48 and 49, and all of the parts which are supported thereby and rotate therewith, are in static balance with respect to the axis of rotation of shaft 43.

From this much it will be seen that the work piece may then be freely rotated universally without displacement of its center of gravity. Such universal adjustment is made by rotation of the work piece about either or both of the axes of spindle 20 and shaft 43, both of which intersect the center of gravity of the rotating mass. There is accordingly no tendency of the work to move from any adjusted position in which it may be placed.

To more conveniently position the work, the axis of shaft 43 is preferably adjusted about pivot pins 62 to cause the tube 33 to again extend horizontally or in any other desired direction. This adjustment does not disturb the relationship between the two axes of rotation, shaft 43 and spindle 20, and the center of gravity of the rotating mass. One such finally adjusted arrangement is illustrated in Fig. 1 and the line A, which is an extension of the axis of rotation of shaft 43, passes through the center of gravity of the mass which rotates with shaft 43.

What is claimed is:

1. A work holder comprising a base having a pedestal, a bearing sleeve pivotally mounted on the pedestal for angular adjustment about a horizontal axis, a journal rotatably mounted in said sleeve, an arm, adjustable means pivotally, adjustably connecting one end of said arm to said journal at an angle thereto, said adjustable means being constructed to permit adjustment of said arm in a conical path by rotation of said journal in the bearing sleeve, a work holding member, means for rotatably connecting said member to the opposite end of said arm for angular adjustment about the axis of the arm, said two mentioned means permitting adjustment of the parts to a position where the axis of said journal intersects the center of gravity of the mass comprising the work, the work holding member, the arm and the means connecting the work holding member to the arm.

2. A work holder comprising a base having a pedestal, a bearing sleeve mounted on the pedestal, a journal rotatably mounted in said sleeve, an arm, adjustable means pivotally, adjustably connecting one end of said arm to said journal at an angle thereto, said adjustable means being constructed to permit adjustment of said arm in a conical path by rotation of said journal in the bearing sleeve, a work holding member, means for rotatably connecting said member to the opposite end of said arm for angular adjustment about the axis of the arm, said two mentioned means permitting adjustment of the parts to a position where the axis of said journal intersects the center of gravity of the mass comprising the work, the work holding member, the arm and the means connecting the work holding member to the arm.

3. A work holder comprising a base having a pedestal, a rotatable connection comprising a sleeve element and an element journaled therein for relative rotation, one of said elements being mounted on said pedestal, an arm, means adjustably connecting one end of said arm to the other of said elements at an angle thereto, said adjustable means being constructed to permit adjustment of said arm in a conical path by relative rotation of said two elements, a work holding member, means for rotatably connecting said member to the opposite end of said arm for angular adjustment about the axis of the arm, said two mentioned means permitting adjustment of the parts to a position where the axis of said journal intersects the center of gravity of the mass comprising the work, the work holding member, the arm and the means connecting the work holding member to the arm.

4. Apparatus for holding and positioning work of various shapes and sizes for rotation in a balanced condition, said apparatus comprising a support and an arm projecting generally outwardly therefrom, a work holding element rotatably mounted at the outer end of said arm for free rotation on an axis substantially perpendicular to said arm, the inner end of said arm having a freely rotatable bearing connection with said support, the axis of said freely rotatable bearing connection extending at an angle to but lying in the same plane as the axis of the rotatable mounting of the work holding element, said arm having lockable adjusting means outwardly of said freely rotatable bearing connection for varying the angle between the arm and the axis of the rotatable connection and for maintaining the coplanar relationship between said two axes in various angular positions of said arm, whereby said arm may be angularly adjusted to support the work so that the axis of rotation of said arm substantially intersects the center of gravity of the arm and the work carried thereby.

5. Apparatus for holding and positioning work of various shapes and sizes for rotation in a balanced condition, said apparatus comprising a support and an arm projecting generally outwardly therefrom, a work holding element rotatably mounted at the outer end of said arm for free rotation on an axis substantially perpendicular to said arm, the inner end of said arm having a freely rotatable bearing connection with said support, the axis of said freely rotatable bearing connection extending at an angle to but lying in the same plane as the axis of the rotatable mounting of the work holding element, said arm having lockable adjusting means outwardly of said freely rotatable bearing connection for varying the angle between the arm and the axis of the rotatable connection and for maintaining the coplanar relationship between said two axes in various angular positions of said arm, whereby said arm may be angularly adjusted to support the work so that the axis of rotation of said arm substantially intersects the center of gravity of the arm and the work carried thereby, and means on said support for adjusting the axis of said freely rotatable bearing connection between said arm and said support in various angular positions relative to the horizontal.

6. Apparatus for holding and positioning work of various shapes and sizes for rotation in a balanced condition, said apparatus comprising a support and an arm projecting generally outwardly therefrom, a work holding element rotatably mounted at the outer end of said arm for free rotation on an axis substantially perpendicular to said arm, the inner end of said arm having a freely rotatable bearing connection with said support, the axis of said freely rotatable bearing connection extending at an angle to but lying in the same plane as the axis of the rotatable mounting of the work holding element, said arm having lockable adjusting means outwardly of said freely rotatable bearing connection for varying the angle between the arm and the axis of the freely rotatable bearing connection and for rotating the work holding element about an axis coincident with the axis of the arm to maintain the coplanar relationship between said two axes in various angular positions of said arm, whereby said arm may be angularly adjusted to support the work so that the axis of rotation of said arm substantially intersects the center of gravity of the arm and the work carried thereby.

7. Apparatus for holding and positioning work of various shapes and sizes for rotation in a balanced condition, said apparatus comprising a support and an arm projecting generally outwardly therefrom, a work holding element rotatably mounted at the outer end of said arm for free rotation on an axis substantially perpendicular to said arm, the inner end of said arm having a freely rotatable bearing connection with said support, the axis of said freely rotatable bearing connection extending at an angle to but lying in the same plane as the axis of the rotatable mounting of the work holding element, said arm having lockable adjusting means outwardly of said freely rotatable bearing connection for varying the angle between the arm and the axis of the freely rotatable bearing connection and for rotating the work holding element about an axis coincident with the axis of the arm to maintain the coplanar relationship between said two axes in various angular positions of said arm, whereby said arm may be angularly adjusted to support the work so that the axis of rotation of said arm substantially intersects the center of gravity of the arm and the work carried thereby, and means on said support for adjusting the axis of said freely rotatable bearing connection between said arm and said support in various angular positions relative to the horizontal.

References Cited in the file of this patent

UNITED STATES PATENTS

| | | |
|---|---|---|
| 1,432,725 | Nolting | Oct. 17, 1922 |
| 2,390,428 | Disse | Dec. 4, 1945 |
| 2,488,296 | Kraus | Nov. 15, 1949 |
| 2,495,438 | Bentley et al. | Jan. 24, 1950 |

FOREIGN PATENTS

| | | |
|---|---|---|
| 329,723 | Germany | Aug. 29, 1919 |